United States Patent
Usov et al.

(10) Patent No.: US 12,515,824 B2
(45) Date of Patent: Jan. 6, 2026

(54) MULTI-FUNCTION RENDEZVOUS AND CAPTURE MODULE

(71) Applicant: KURS ORBITAL S.R.L., Turin (IT)

(72) Inventors: Volodymyr Volodymyrovych Usov, Turin (IT); Vadym Valeriiovych Vasyliev, Kiev (UA); Leonid Akymovych Hodunok, Kiev (UA); Vadym Anatoliiovych Volkov, Kharkov (UA)

(73) Assignee: KURS ORBITAL S.R.L., Turin (IT)

( * ) Notice: Subject to any disclaimer, the term of this patent is extended or adjusted under 35 U.S.C. 154(b) by 0 days.

(21) Appl. No.: 18/727,028

(22) PCT Filed: Jan. 3, 2023

(86) PCT No.: PCT/EP2023/050046
§ 371 (c)(1),
(2) Date: Jul. 5, 2024

(87) PCT Pub. No.: WO2023/131599
PCT Pub. Date: Jul. 13, 2023

(65) Prior Publication Data
US 2025/0066046 A1   Feb. 27, 2025

(30) Foreign Application Priority Data

Jan. 4, 2022   (UA) .............................. u 2022 00031

(51) Int. Cl.
*B25J 11/00*   (2006.01)
*B64G 1/64*   (2006.01)
(Continued)

(52) U.S. Cl.
CPC ............. *B64G 1/6462* (2023.08); *B25J 11/00* (2013.01); *G01S 13/4463* (2013.01); *G01S 2013/0254* (2013.01)

(58) Field of Classification Search
CPC ....... B25J 11/00; B25J 11/002; B25J 11/0025; B25J 11/005; B25J 11/0055; B25J 11/006;
(Continued)

(56) References Cited

U.S. PATENT DOCUMENTS 5,299,764 A    4/1994 Scott
6,675,068 B1 *  1/2004 Kawasaki ................. B25J 9/08
                                                  901/50
(Continued)

FOREIGN PATENT DOCUMENTS

CN   101323377 B    11/2010
CN   108382612 A  *  8/2018  .............. B25J 15/00
(Continued)

OTHER PUBLICATIONS

International Search Report for International Patent Application No. PCT/EP2023/050046, mailed Mar. 23, 2023.
(Continued)

*Primary Examiner* — Joshua E Rodden
(74) *Attorney, Agent, or Firm* — CANTOR COLBURN LLP

(57) ABSTRACT

The multi-functional rendezvous and capture module contains a mechanical capture system. The module includes a system of mutual measurements with a radar module, a technical vision system, a laser rangefinder containing a radar module and two independent locators, a locator with an active phased antenna array and a locator of a radar orthogonal interferometer, and a control unit; the mechanical capture system includes robot manipulators, a control unit, and damping supports.

1 Claim, 3 Drawing Sheets

(51) Int. Cl.
*G01S 13/44* (2006.01)
*G01S 13/02* (2006.01)

(58) Field of Classification Search
CPC ... B25J 11/0065; B25J 11/007; B25J 11/0095; B64G 1/4024; B64G 1/64; B64G 1/641; B64G 1/642; B64G 1/6425; B64G 1/643; B64G 1/644; B64G 1/645; B64G 1/6455; B64G 1/6457; B64G 1/6459; B64G 1/646; B64G 1/6462; B64G 1/6464; B64G 4/00; B64G 2004/005
USPC .................................................. 244/172.4
See application file for complete search history.

(56) References Cited

U.S. PATENT DOCUMENTS

| | | | | |
|---|---|---|---|---|
| 7,163,179 | B1 * | 1/2007 | Taylor | B64G 1/1078 244/159.4 |
| 7,861,975 | B2 * | 1/2011 | Behrens | B64G 1/6464 244/172.4 |
| 9,399,295 | B2 * | 7/2016 | Roberts | B25J 19/0091 |
| 9,669,950 | B2 * | 6/2017 | Rembala | B64G 1/6462 |
| 12,195,204 | B2 * | 1/2025 | Deuitch | B64G 1/4024 |
| 2015/0314893 | A1 | 11/2015 | Rembala et al. | |
| 2016/0130020 | A1 * | 5/2016 | Chambert | B64G 4/00 244/172.4 |
| 2019/0033440 | A1 | 1/2019 | Boolos et al. | |
| 2019/0366426 | A1 * | 12/2019 | Wang | B25J 15/0608 |
| 2021/0300602 | A1 * | 9/2021 | Bultitude | B64G 1/4024 |
| 2023/0331401 | A1 * | 10/2023 | Helvajian | B64G 1/646 |
| 2023/0415923 | A1 * | 12/2023 | Scheidegger | B64G 1/2224 |

FOREIGN PATENT DOCUMENTS

| | | | | |
|---|---|---|---|---|
| CN | 111038745 | A * | 4/2020 | ............. B64G 1/646 |
| CN | 112109928 | A | 12/2020 | |
| CN | 113148228 | A | 7/2021 | |
| CN | 114162353 | A * | 3/2022 | ............... B64G 4/00 |
| CN | 115477024 | A * | 12/2022 | ............... B64G 4/00 |
| JP | H05246400 | A | 9/1993 | |
| JP | 08071964 | A * | 3/1996 | ............. B64G 1/646 |
| UA | 70500 | U | 6/2012 | |
| WO | 2021089938 | A1 | 5/2021 | |

OTHER PUBLICATIONS

Huang Panfeng et al., Dexterous Tethered Space Robot: Design, Measurement, Control, and Experiment, IEEE Transactions on Aerospace and Electronic Systems, Jun. 1, 2017, pp. 1452-1468, vol. 53, No. 3, IEEE Service Center, Piscataway, NJ, US, XP011652012.
Written Opinion for International Patent Application No. PCT/EP2023/050046, mailed Mar. 23, 2023.

* cited by examiner

MULTI-FUNCTION RENDEZVOUS AND CAPTURE MODULE

CROSS-REFERENCE TO RELATED APPLICATIONS

This application is a National Phase Application of PCT International Application PCT/EP2023/050046, having an International Filing Date of Jan. 3, 2023 which claims priority to Ukrainian Patent Application No. U 2022 00031 filed Jan. 4, 2022, each of which is hereby incorporated by reference in its entirety.

FIELD OF THE INVENTION

The present invention relates to the rocket and space industry, namely to space objects that perform orbital maintenance. The multi-functional rendezvous and capture module can be used as part of service spacecrafts for conducting orbital maintenance operations.

BACKGROUND OF THE INVENTION

Known unit for docking the filling lines of the rocket launcher contains a carriage with radial slides that interact with the rollers of the risers mounted on the floor of the niche of the launcher, the lower and upper filling pipes that are mounted on the front of the carriage and interact with the filling necks of the rocket, a rotary bracket with a cover connected to the drive by means of a lever system with the capability of turning in a radial plane, brackets for fixing the pipelines of the main lines in the middle part of the carriage of the unit, and flexible hoses of the lines that connect the pipelines of the unit with ground pipelines and interact with profiled brackets. The unit is equipped with a chain, which is fixed to the rear of the carriage and is made in the form of plates connected by means of horizontal axes with the capability to move in a radial plane [UA 70500 U, B64G 5/00, F41F 3/00, 0311.06.2012]. This design is very complex and unstable.

The closest analog, both in essence and in terms of the tasks being solved, is the capture and docking mechanism. The mechanism consists of a fixed platform, a flat scaling mechanism, three branched connecting rod chains and three manual rear end capture modules, with one end of the three branched connecting rod chains pivotally attached to the fixed platform through hook joints and relative to the fixed platform, the other ends of the three branched connecting rod chains are connected to one side of the plane scaling mechanism through equivalent ball joints and can rotate in three directions relative to the plane scaling mechanism, and the other side of the plane of the scaling mechanism is connected to the manual tail section capture modules. Before performing the capture, the plane scaling mechanism is deformed in one plane, so that the ratio of the relative position of the capture manual tail section modules changes, and the target is flexibly captured by the manual tail section capture modules; and after the capture is completed, the plane scaling mechanism is deformed again, so that a stiffness lock is implemented, and the target capture and docking is completed [CN 112109928 A, B64G4/00, 22.12.2020].

The disadvantage of the known design is its low operational qualities.

SUMMARY OF THE INVENTION

The object of the present invention is to provide an improved design of a multifunctional rendezvous and capture module, which allows improving its operational qualities by introducing new elements and technical solutions.

The object is achieved by a multifunctional rendezvous and capture module containing a mechanical capture system, as described herein, and consisting of a system of mutual measurements with a radar module, a technical vision system, a laser rangefinder containing a radar module and two independent locators, a locator with an active phased antenna array and a radar orthogonal interferometer locator and a control unit; the mechanical capture system consisting of robot manipulators, a control unit, and damping supports.

BRIEF DESCRIPTION OF THE FIGURES

The present invention will be better understood with reference to the following drawings.

DETAILED DESCRIPTION

Figure 1:
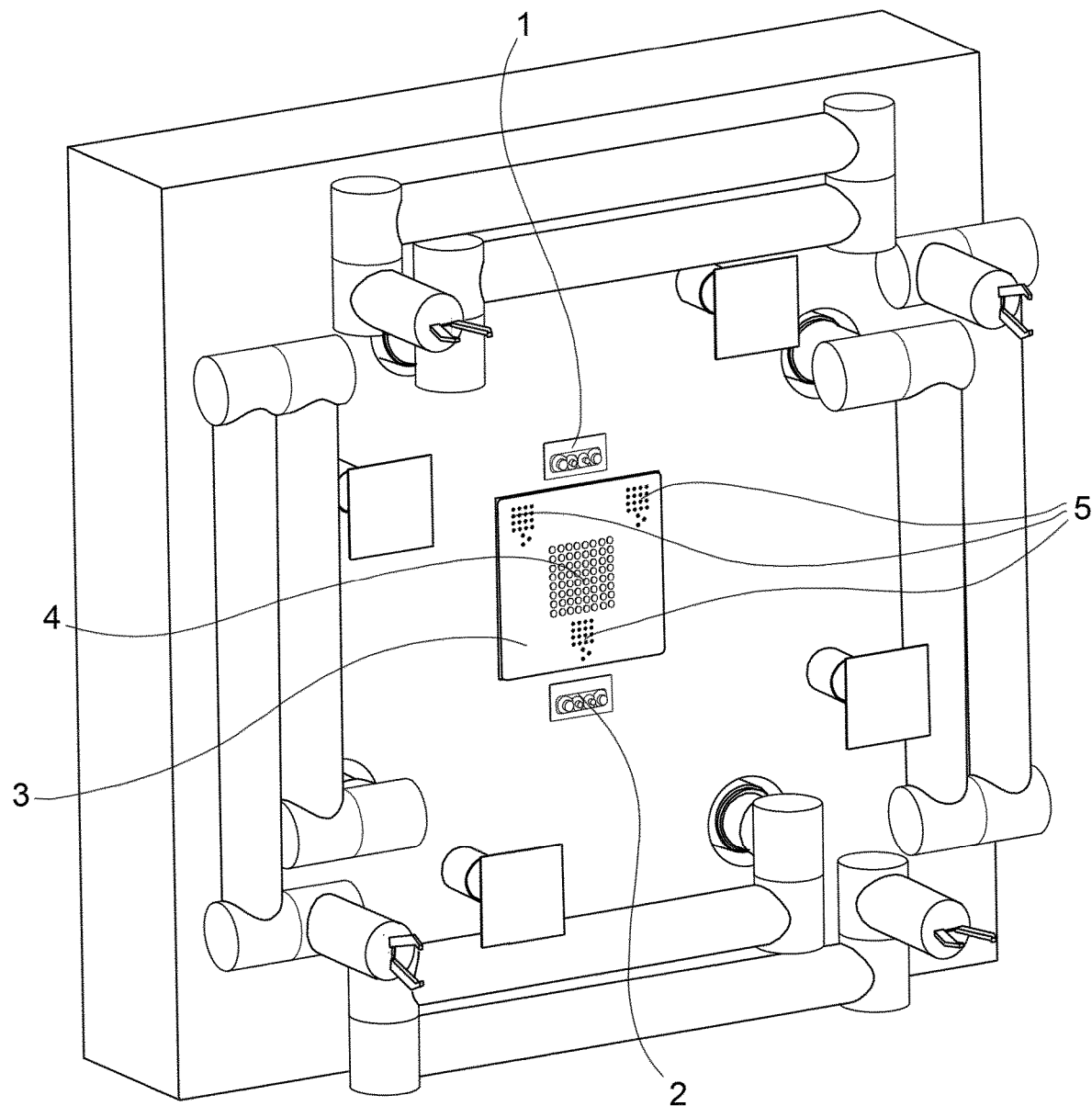
FIG. 1 is a front view of a multifunctional rendezvous and capture module according to the present invention.
Figure 2:
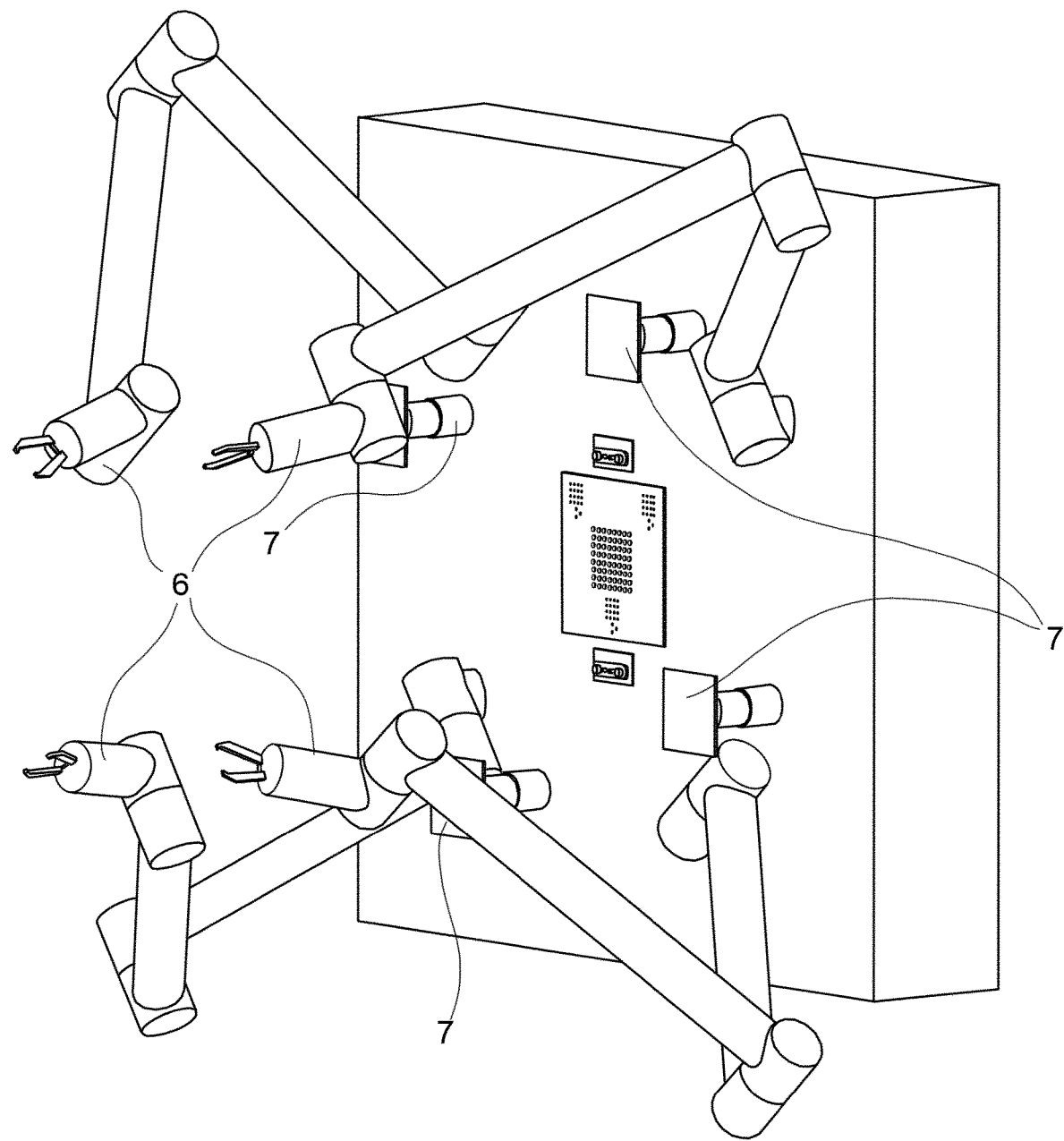
FIG. 2 is a further view of the module of FIG. 1 in another configuration.
Figure 3:
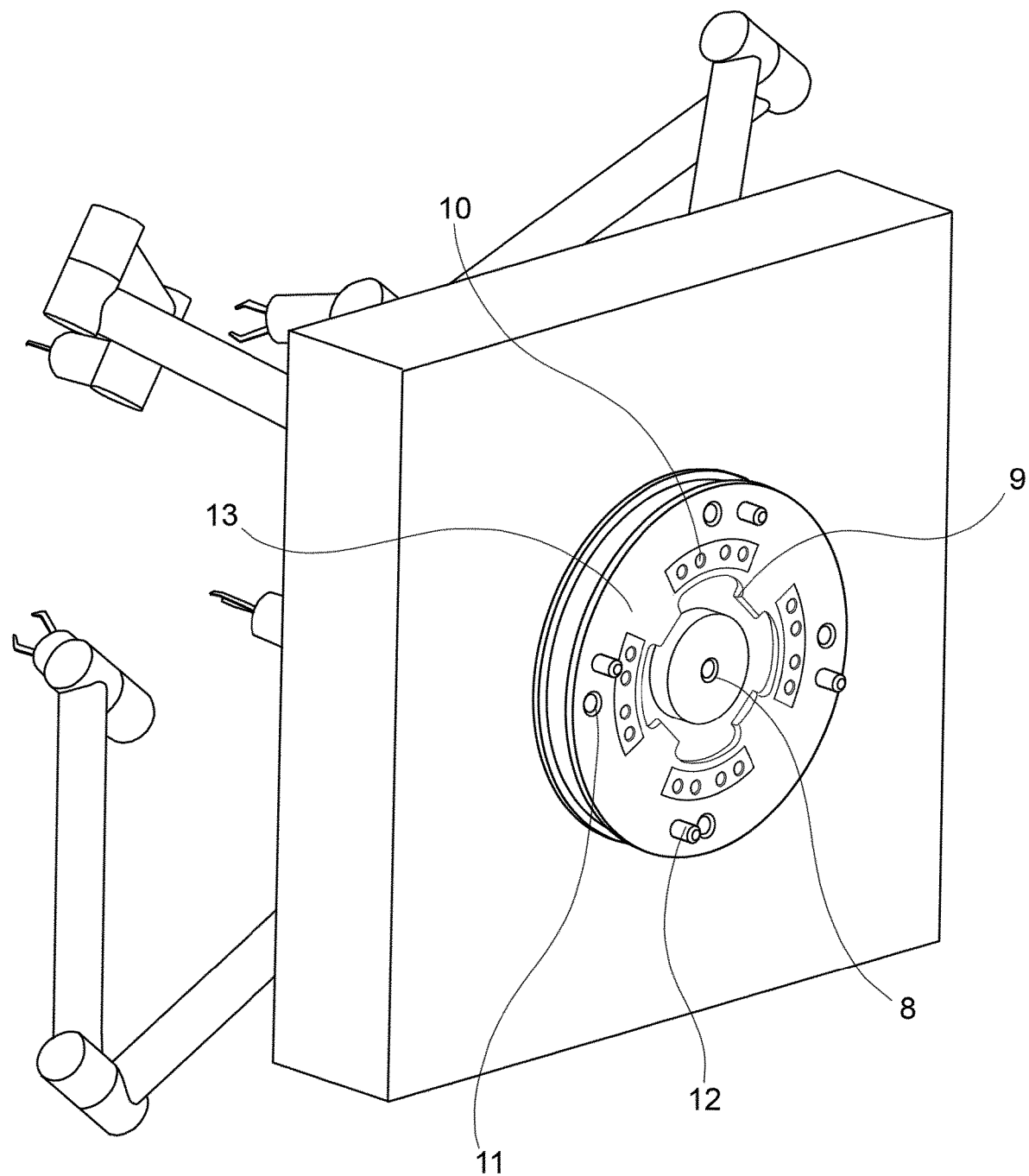
FIG. 3 is a rear view of the module of FIG. 1.

The multifunctional rendezvous and capture module contains a mutual measurement system with a laser rangefinder 1, a technical vision system 2, and a radar module 3. The radar module 3 consists of two independent locators, a locator with an active phased array antenna 4 and a locator of an orthogonal radar Interferometer 5, as well as a control unit (located inside the module).

The mechanical capture system contains manipulator robots 6, providing shock-free capture, holding and undocking of the client apparatus, a control unit (located inside the module) designed to process information from sensors, make decisions to control the robot manipulator nodes, generate control signals, exchange information from the mechanical capture system and the mutual measurement system, collect and transmit information about the state of the robot manipulator nodes, distances, contacts, holding force, and damping supports 7, providing shock-free tightening of the client spacecraft and service spacecraft.

To connect to the space platform, the module is equipped with an attachment device 13. Mechanical connection is provided by means of a mechanical interface 9 and aligning pins 12. The power connection is provided by an electrical interface 10.

Information exchange between the module and the space platform is carried out via the data interface 8, and if necessary-via the optical interface 11.

When designing service spacecraft, the rendezvous and capture equipment was not considered as a separate part of the spacecraft, which causes difficulties in their design.

Creating a separate module makes it possible to take into account: ensuring the adaptability of the mutual measurement system to the service spacecraft of various classes and purposes; providing a block-modular structure of the mutual measurement system, including functional units and structural technological and software modules; and using new signal processing algorithms, hardware and software components of functional units, allowing to minimize efforts to solve a set of problems proposed.

The multifunctional module includes a mutual measurement system and a mechanical capture system.

The integration of the mutual measurement system and the mechanical capture system into a separate module allows it to be adapted for use in service spacecraft with different space platforms by connecting them.

When creating the service spacecraft, the rendezvous and capture equipment was not considered as a separate part of the spacecraft. Well-known missions are ESS, GVS, which planned to use a radar system for long-range rendezvous, and optical devices for medium-range rendezvous as separate devices.

The principle of operation of the present invention is that the multifunctional rendezvous and capture module as part of the service spacecraft measures the position of the client spacecraft in the coordinates of the service spacecraft using the mutual measurement system.

The mechanical capture system is designed for shock-free capture/docking at a given location of the client spacecraft with the necessary stiffness of the service spacecraft-client spacecraft connection, as well as shock-free release/undocking. To connect to the space platform, the module is equipped with an attachment device.

The mutual measurement system is designed to measure the parameters of mutual motion and mutual position of the service spacecraft and the client spacecraft to ensure the rendezvous operation of the service spacecraft with the client spacecraft.

The mutual measurement system provides the following operations: detection of the client spacecraft; determination of the mutual orientation of the service spacecraft relative to the client spacecraft during the rendezvous of the service spacecraft with the client spacecraft and the departure of the service spacecraft from the client spacecraft; determination of the node to capture the client spacecraft; orbital inspection of the client spacecraft; survey of the client spacecraft in order to detect external defects during the rendezvous and docking; detection of foreign objects passing at a distance of up to 7000 m from the service spacecraft.

The combined design scheme allows to use the advantages of the radio-technical method of measuring the motion parameters of the client spacecraft in the far section of rendezvous, and the advantages of optical means in the near section.

Advantages of using radio engineering equipment: at a long distance, it does not create restrictions related to the position of celestial bodies due to the influence of clutter or work in the shadow area; radio engineering technologies are more developed in real operating conditions; the methods used to measure the parameters of convergence of objects using a radar orthogonal interferometer allow to ensure the guidance of the service spacecraft on the plane of the junction of the client spacecraft at a distance of 20 m with sufficient accuracy, which allows to significantly simplify the requirements for the equipment of the technical vision system.

Additional advantages are acquired by the radio engineering option using a locator with an active phased antenna array: the active phased array antenna is a modern universal platform that has a modular construction principle and allows to create a number of radar systems built on the same or similar technical principles, but differ in the main technical specifications, such as detection range, coordinate measurement accuracy, noise immunity; since the required capacity level and radiation pattern of the active phased array antenna are formed by summing up many low-power signals in space and weight and size characteristics are significantly reduced, the problem of heat removal is solved simpler, since there is no need to use powerful stages; failure of individual elements of the receiving and transmitting path practically does not lead to significant changes in the system parameters.

Advantages of using optical means: optical systems work most effectively at a distance of up to 20 m; in the near area, starting from 20 m, they provide measurement of rendezvous-specific parameters with insignificant errors; the cost characteristics of a technical vision system based on TV cameras and a laser rangefinder are lower compared to scanning laser systems.

The modular design of the equipment allows to optimize the measurement system for solving specific problems both in terms of the set and error of measured parameters, range, and in terms of dimensions, weight, and energy consumption.

The mechanical capture system is designed for shock-free capture/docking at a given location of the client spacecraft with the necessary stiffness of the service spacecraft-client spacecraft connection, as well as shock-free release/undocking.

Direct transmission of the parameters of mutual motion and mutual position of the service spacecraft and the client spacecraft from the mutual measurement system to the mechanical capture system provides a more accurate capture mode for the client spacecraft.

The multifunctional rendezvous and capture module differs in that it provides integration of the mutual measurement system and the mechanical capture system into a separate module that can be adapted for use in orbital service operations with various space platforms. The methods used to measure the rendezvous-specific parameters of objects using a radar orthogonal Interferometer make it possible to ensure that the client spacecraft is guided to the plane of the junction of the client spacecraft at a distance of 20 m with sufficient accuracy, which significantly simplifies the requirements for the technical vision system. The use of a locator with an active phased array antenna over long distances allows, in addition to measuring the position of the client spacecraft, to monitor the surrounding space. Direct transmission of the parameters of mutual motion and mutual position of the service spacecraft and the client spacecraft from the mutual measurement system to the mechanical capture system provides a more accurate capture mode for the client spacecraft. The combined design scheme of the mutual measurement system allows to use the advantages of the radio-technical method for measuring the motion parameters of the service spacecraft in the far section of rendezvous, and the advantages of optical means in the near section.

The invention claimed is:

1. A multifunctional rendezvous and capture module containing a mechanical capture system, wherein the multifunctional rendezvous and capture module consists of a mutual measurement system with a laser range finder, a technical vision system, a radar module including two independent locators, a first one of the two independent locators being a locator with an active phased array antenna, a second one of the two independent locators being a locator of an orthogonal radar interferometer, and a control unit; the mechanical capture system comprising manipulator robots, a control unit, and damping supports.

* * * * *